Figures 1, 2:
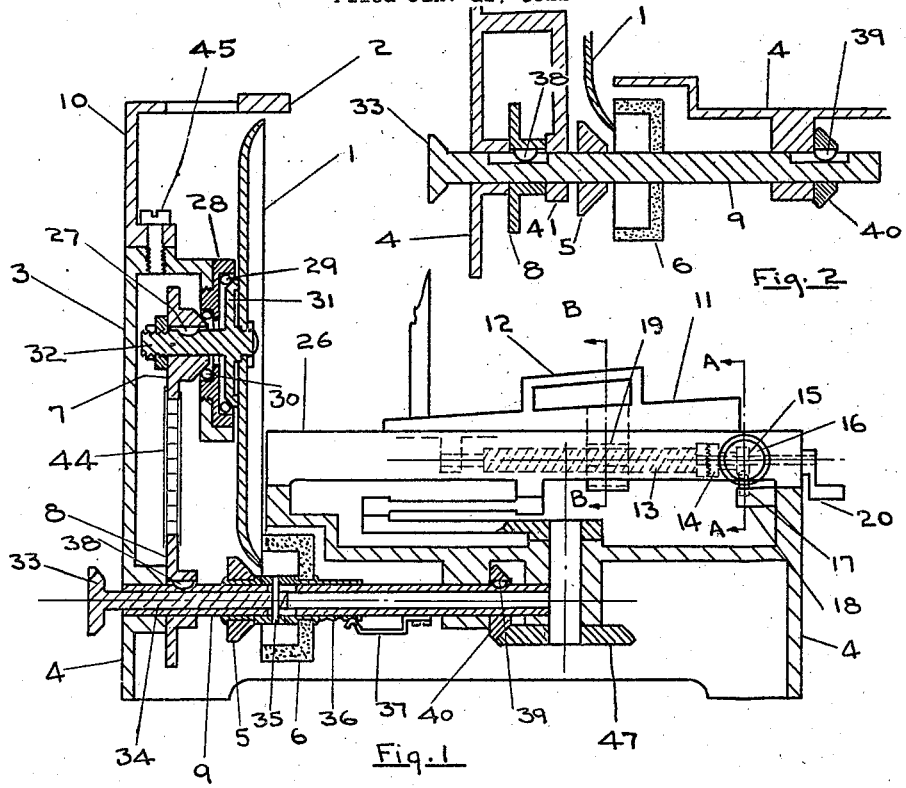

Nov. 27, 1923.

G. JAQUETTE

MEAT SLICING MACHINE

Filed Jan. 11, 1922

1,475,392

Grantham Jaquette  INVENTOR.

Patented Nov. 27, 1923.

1,475,392

UNITED STATES PATENT OFFICE.

GRANTHAM JAQUETTE, OF PHILADELPHIA, PENNSYLVANIA.

MEAT-SLICING MACHINE.

Application filed January 11, 1922. Serial No. 528,531.

*To all whom it may concern:*

Be it known that I, GRANTHAM JAQUETTE, a citizen of the United States, residing at Philadelphia, State of Pennsylvania, have invented certain new and useful Improvements in Meat-Slicing Machines, of which the following is a specification, reference being had to the accompanying drawings, forming a part of this specification.

My invention relates to meat slicing machines having a circular revolving knife, grinding devices for sharpening the same, a reciprocating carriage, a meat table and a feed mechanism for moving same, and a base for supporting these various parts.

The operation of the parts to which my invention especially relates is as follows:—

Knife safety guard 2 and knife safety guard support 10 are made integrally in one piece and attached to base extension 3 by screw 38, providing a rigid and simplified safety guard and support.

Raceway 28 is made so as to accommodate two rows of balls, 29 and 30, which are adjacent, while sprocket 7 is outside of, rather than between the two rows of balls which is the usual arrangement. This provides a rigid, accurate and simplified construction of the knife bearing.

Grinding wheels 5 and 6 are located within base 4, which is utilized as a housing for same. Heretofore all grinding wheels on meat slicers were placed in a separate housing, and also, they were rotated by the friction of them against the rotary knife. In my invention these grinding wheels are mounted on a rotating shaft 9, and said shaft is rotated by gears 40 and 47. Thus the grinding wheels are rotated against the motion of the rotating knife and a much superior grinding action is obtained.

Figures 3, 4:
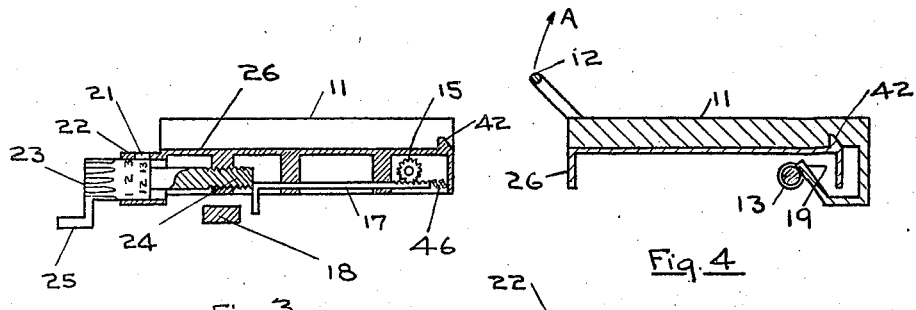
Figure 5:
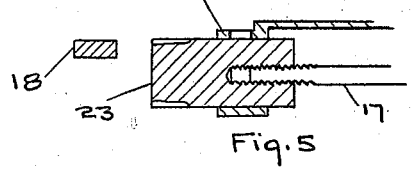

Fig. 1 is a section taken thru a slicing machine on the center of the rotating knife and passing through the machine vertically. Fig. 2 is an alternate arrangement of some of the details shown in Fig. 1, but for which no claim is made. Fig. 3 is a section on line A—A Fig. 1, and Fig. 4 is a section on B—B Fig. 1. Fig. 5 is an alternate arrangement of the parts shown in Fig. 3 bearing the same numbers.

In Fig. 3, sliding rack 17 rotates pinion 15, both being carried upon reciprocating carriage 26, as are also feed adjustment screw 24 knob 23 and crank 25, the knob and crank being used to actuate screw 24 which controls the thickness of slice taken.

Fixed stop 18 is attached to machine base 4 (Fig. 1) and when reciprocating carriage 26 brings rack 17 against stop 18, said rack 17 slides and rotates pinion 15, said pinion 15 being rotated in the opposite direction by recoil spring 46 as soon as reciprocating carriage 26 carries rack 17 away from fixed stop 18. Now, this reciprocating motion of rack 17 is adjustable by moving feed adjustment screw 24 back or forth and this is done by turning knob 23 in either direction. Having numbers upon it and being carried in boss 22 having window 21, these numbers may be seen through the window and serve as an indication of the thickness of slice, inasmuch as the relative motion of pinion 15 determines the same, in a manner not included in this patent.

Referring to Figs. 1 and 4, meat table 11 carries feed nut 19 to which it is rigidly attached. Said feed nut is in mesh with feed worm 13 and consequently operated by it. Meat table 11 may be lifted upward by handle 12, and as feed nut 19 is attached to meat table 12, it is also lifted therewith, so as to clear feed worm 13, thus throwing the feed mechanism out of mesh. Heretofore this disengagement was done by a separate lever, thus my invention provides a simplified construction.

I claim:—

1. In a meat slicing machine, a circular knife, a bearing for same comprising a large cone, a raceway for same, balls for same, a shaft, a small cone and raceway with balls for same concentric with the large raceway.

2. In a slicing machine a circular knife, a shaft for same, a chain for driving same, a shaft driving said chain, grinding devices mounted thereon and rotated thereby, and means for bringing said grinding devices and said circular knife in contact.

3. In a meat slicing machine a circular knife, a base, an opening in said base, the circular knife extending through the opening, a driving shaft, grinding devices, means for rotating said grinding devices and said circular knife by means of said driving shaft, and means for bringing the circular knife and the grinding devices in contact.

4. In a meat slicing machine a feed mechanism, an adjustable stop comprising a screw with a hand knob and crank mounted thereon and numbers on the periphery of said hand knob, and a boss in which said hand knob rotates, and a window in said boss through which said numbers may be seen.

5. In a meat slicing machine a carriage, a meat table having an arm attached thereto and extending around the side of and thence beneath the aforesaid carriage and there bearing upon a feed worm.

In testimony whereof I hereunto affix my signature.

GRANTHAM JAQUETTE.

Witnesses:
HARRY JAQUETTE,
HOWARD J. BLUMRICK.